United States Patent [19]
Tomisawa et al.

[11] Patent Number: 5,604,303
[45] Date of Patent: Feb. 18, 1997

[54] COMBUSTION CONDITION DETECTING SYSTEM OF INTERNAL COMBUSTION ENGINE

[75] Inventors: Naoki Tomisawa; Atsumi Hoshina, both of Atsugi, Japan

[73] Assignee: Unisia Jecs Corporation, Atsugi, Japan

[21] Appl. No.: 325,665

[22] Filed: Oct. 19, 1994

[30] Foreign Application Priority Data

Oct. 19, 1993 [JP] Japan .................................. 5-261130

[51] Int. Cl.$^6$ .................................................. G01M 15/00
[52] U.S. Cl. ..................................................... 73/117.3
[58] Field of Search .................... 73/116, 117.3, 73/35.06, 35.12, 115; 123/419, 436; 364/431.08

[56] References Cited

U.S. PATENT DOCUMENTS

| | | | |
|---|---|---|---|
| 4,690,116 | 9/1987 | Takahashi | 123/425 |
| 4,693,221 | 9/1987 | Nakajima et al. | 123/425 |
| 4,739,649 | 4/1988 | Tanaka | 73/117.3 |
| 4,744,649 | 4/1988 | Tanaka | 73/117.3 |
| 4,750,103 | 6/1988 | Abo et al. | 73/35.04 |
| 4,781,059 | 11/1988 | Suzuki et al. | 73/117.3 |
| 4,821,194 | 4/1989 | Kawamura | 364/431.08 |
| 4,843,870 | 7/1989 | Citron et al. | 73/116 |
| 4,892,075 | 1/1990 | Iriyama et al. | 73/117.3 |
| 4,903,210 | 2/1990 | Akasu | 364/431.08 |
| 4,984,546 | 1/1991 | Shimomura et al. | 123/425 |
| 5,058,552 | 10/1991 | Shimomura et al. | 123/425 |
| 5,069,183 | 12/1991 | Nagano et al. | 73/117.3 |
| 5,105,657 | 4/1992 | Nakaniwa | 73/117.3 |
| 5,153,834 | 10/1992 | Abo et al. | 364/431.08 |
| 5,359,883 | 11/1994 | Baldwin et al. | 73/117.3 |
| 5,469,735 | 11/1995 | Watanabe | 73/118.1 |

FOREIGN PATENT DOCUMENTS

| | | |
|---|---|---|
| 63-17432 | 2/1988 | Japan . |
| 64-15937 | 1/1989 | Japan . |
| 4-81557 | 3/1992 | Japan . |

*Primary Examiner*—Richard Chilcot
*Assistant Examiner*—Eric S. McCall
*Attorney, Agent, or Firm*—Foley & Lardner

[57] ABSTRACT

A combustion condition detecting system of an internal combustion engine, comprises a first device for detecting the pressure in a cylinder of the engine; a second device for setting an integral range in a crankshaft angle in accordance with a rotation speed of the engine; a third device for integrating the pressure within the integral range thereby to derive an integrated value; a fourth device for judging whether or not an abnormal combustion occurs in the cylinder by comparing the integrated value with a reference value; and a fifth device for issuing an alarm when the fourth device judges occurrence of the abnormal combustion. In accordance with the invention, in a lower engine speed side near the idling speed, the integral range is set to appear after a given crankangle position where the pressure in the cylinder exhibits the maximum.

9 Claims, 3 Drawing Sheets

COMBUSTION CONDITION DETECTING SYSTEM OF INTERNAL COMBUSTION ENGINE

BACKGROUND OF THE INVENTION

1. Field of the Invention

The present invention relates in general to detecting systems for detecting the combustion condition of an internal combustion engine, and more particularly to detecting systems of a type which detects abnormal combustion (or misfiring) of the engine by treating an integrated value of the pressure (or combustion pressure) in a cylinder of the engine.

2. Description of the Prior Art

In order to clarify the task of the present invention, one conventional detecting system of the above-mentioned type will be outlined, which is disclosed in Japanese Utility Model First Provisional Publication 64-15937.

In the conventional system of the publication, the combustion pressure is integrated within a given crankangle range (viz., from TDC (top dead center) to ATDC 30° (viz., 30° after top dead center), and the integrated value is compared with a reference value to judge whether or not abnormal combustion has occurred in a cylinder of the engine. It is said that such detecting system can detect the abnormal combustion more precisely than other conventional detecting systems, such as a system in which the time when the combustion pressure exhibits the maximum value or the increasing rate of the combustion pressure is used as a parameter for detecting the abnormal combustion.

However, even the detecting system disclosed by the publication has failed to exhibit a satisfied detecting ability particularly in a case wherein the engine is under a low load and low rotation speed condition. That is, under such condition, the combustion in each cylinder is unstable, and the combustion pressure tends to exhibit a marked dispersion. Furthermore, the integrated value of the combustion pressure derived under such condition fails to show a marked difference from that derived under normal combustion, and thus, it is difficult to keep the high detecting ability throughout substantially whole operation range of the engine.

SUMMARY OF THE INVENTION

It is therefore an object of the present invention to provide a combustion condition detecting system which can precisely detect the abnormal combustion of the engine throughout substantially whole operation range of the engine.

It is another object of the present invention to provide a combustion condition detecting system which can precisely detect the abnormal combustion of the engine even when the engine is under a low load and low rotation speed condition.

According to the present invention, there is provided a combustion condition detecting system of an internal combustion engine. The system comprises first means for detecting the pressure in a cylinder of the engine; second means for setting an integral range in a crankshaft angle in accordance with a rotation speed of the engine; third means for integrating the pressure within the integral range thereby to derive an integrated value; and fourth means for judging whether or not an abnormal combustion occurs in the cylinder by comparing the integrated value with a reference value; wherein, in a given engine speed side, the integral range is set to appear after a given crankangle position where the pressure in the cylinder exhibits the maximum.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
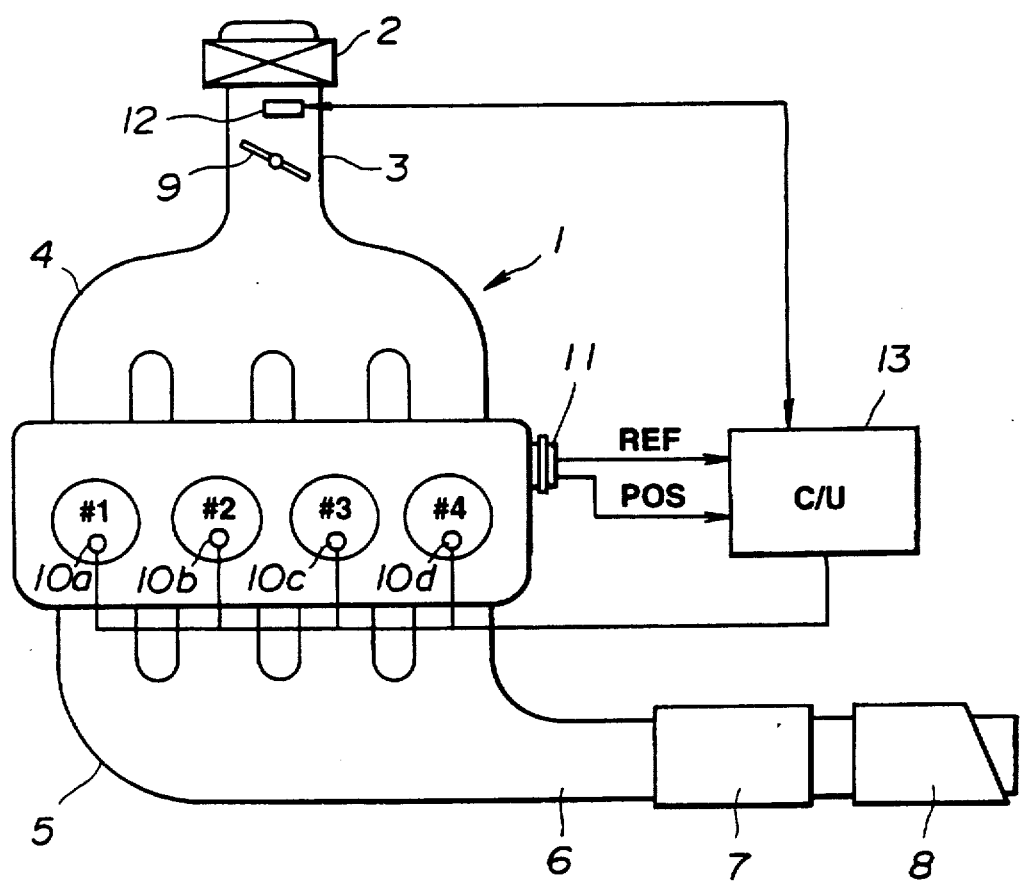
FIG. 1 is a schematic view of an internal combustion engine to which the present invention is practically applied.

In FIG. 1, there is shown an internal combustion engine 1 to which the present invention is practically applied. The engine 1 is an in-line four cylinder type. An air cleaner 2, a throttle chamber 3, a throttle valve 9 and an intake manifold 4 are arranged in the illustrated known manner to constitute an intake system of the engine 1. An exhaust manifold 5, an exhaust duct 6, a three-way catalytic converter 7 and a muffler 8 are arranged in the illustrated known manner to constitute an exhaust system of the engine 1.

The throttle valve 9 is controlled by an accelerator pedal (not shown). As is known, the throttle valve 9 adjusts the amount of air fed to the engine 1.

The four cylinders #1, #2, #3 and #4 have each an ignition plug (not shown) exposed to the combustion chamber. Pressure sensors 10a, 10b, 10c and 10d are respectively installed in the four cylinders #1, #2, #3 and #4. Each pressure sensor detects the pressure prevailing in the associated cylinder. The pressure sensors 10a, 10b, 10c and 10d may be of a type as shown in Japanese Utility Model First Provisional Publication 63-17432 or a type as shown in Japanese Patent First Provisional Publication 4-81557. That is, the type shown in '432 publication acts also as a seat of the ignition plug, and the type shown in '557 publication has a probe directly exposed to the combustion chamber and senses the absolute pressure in the chamber.

Designated by numeral 11 is an optical type crankangle sensor which issues a detecting signal each time a crankshaft (not shown) of the engine 1 comes to a predetermined angular position. The crankangle sensor 11 is in association with a cam shaft (not shown) which is, as is known, synchronously operated with the crankshaft.

In accordance with the present invention, the crankangle sensor 11 issues a reference angular signal "REF" every 180 degrees in crankangle, which corresponds to the phase difference in stroke between two cylinders which make the stroke in succession. Furthermore, the crankangle sensor 11 issues an angular position signal "POS" every unit angle (1 degree or 2 degrees) of the crankshaft.

As shown in FIG. 1, an air flow meter 12 is arranged upstream of the throttle valve 9, which measures the amount of air fed to the engine 1.

The information signals issued from the pressure sensors 10a, 10b, 10c and 10d, the crankangle sensor 11 and the air flow meter 12 are fed to a control unit 13 which includes a microcomputer. That is, by analyzing the information signals, the control unit 13 controls the amount of fuel fed to the engine 1 and the ignition timing of the ignition plugs.

As will be apparent from the following, the control unit 13 is arranged to detect an abnormal combustion (or misfiring) of the engine 1.

Figure 2:
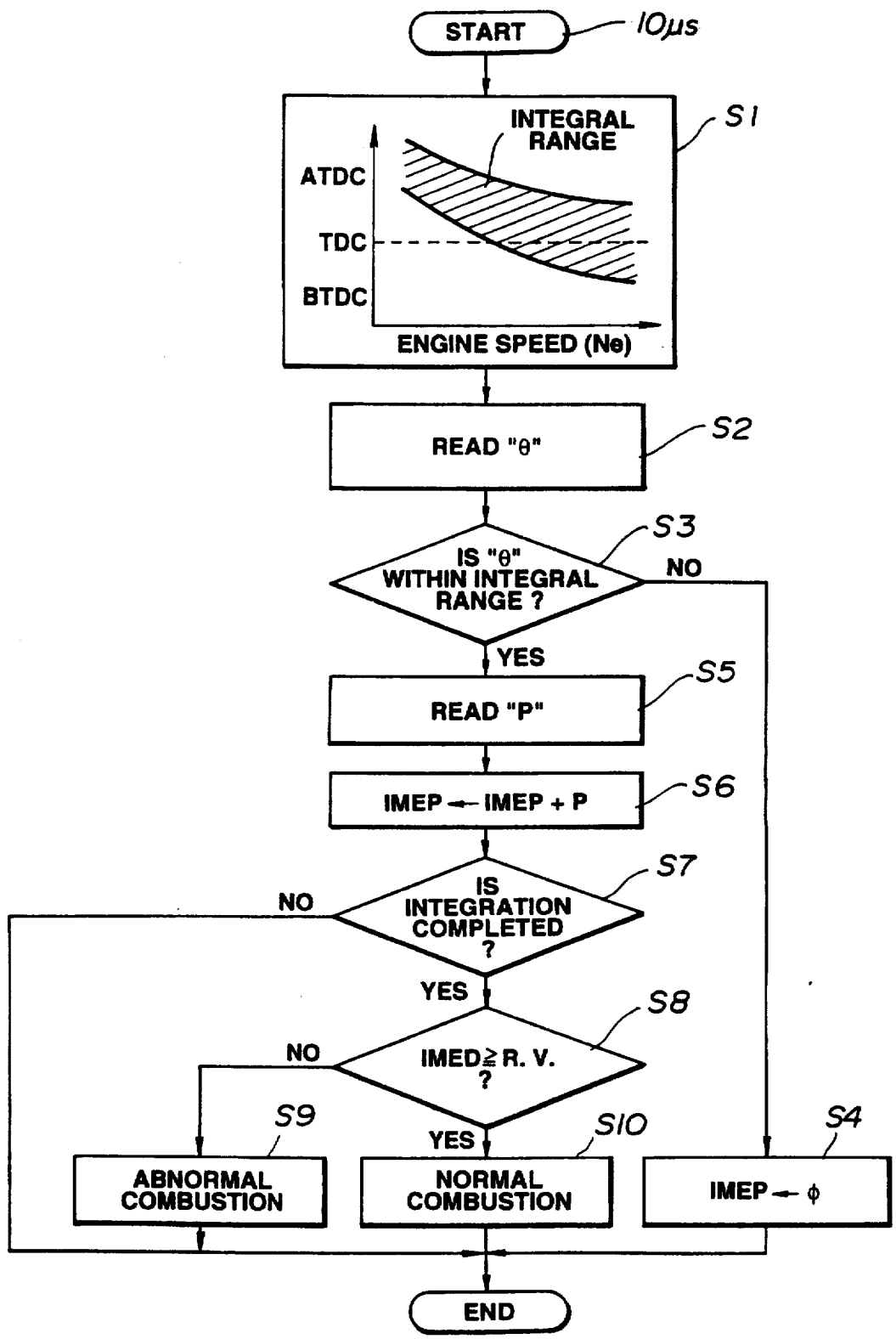
FIG. 2 is a flowchart showing programmed operation steps executed in a computer for detecting the abnormal combustion of the engine.

FIG. 2 is a flowchart showing programmed operation steps which are executed in the computer of the control unit 13 to judge the combustion condition of each cylinder of the engine 1.

It is to be noted that the operation steps of the flowchart are executed, as an interruption subroutine, every a given small time (preferably, each several tens of microseconds).

In the flowchart, at step S1, an integral range (viz., integral time) for which the pressure "P" sensed by each pressure sensor 10a, 10b, 10c or 10d is integrated is set in accordance with an engine rotation speed "Ne" which is derived based on the information signal from the crankangle sensor 11. As is seen from the graph of the step S1, one integral range set in a higher engine speed side is large enough for containing the "TDC" (viz., top dead center) crankangle position, while, the other integral range set at a lower engine speed side is so small as not to contain the "TDC" crankangle position. More specifically, with decrease in the engine rotation speed "Ne", the integral range is gradually shifted toward the "ATDC" (viz., after top dead center) side and gradually reduced in size.

Figure 3:
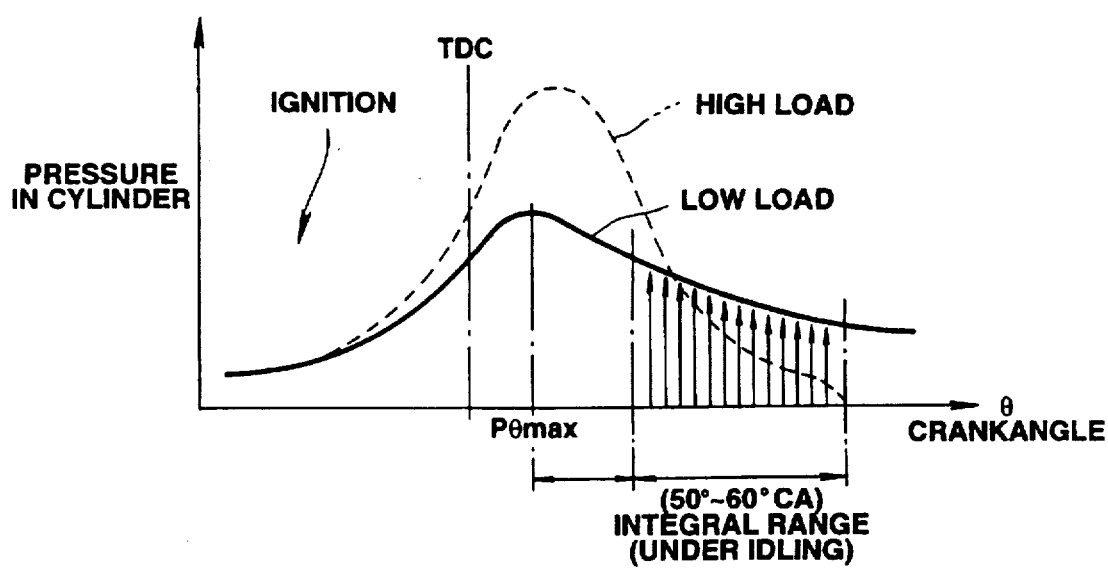
FIG. 3 is a graph showing the characteristic of an integrated value of combustion pressure with respect to the relationship between the crankangle of the engine and the pressure in a cylinder of the engine.

As will be understood from the graph of FIG. 3, in an engine speed lower than a predetermined speed set near the idling speed of the engine 1, the integral range (viz., 50° to 60° in crankangle) is set to appear after a certain crankangle position "PΘmax" where the pressure in a cylinder exhibits the maximum under normal combustion operation of the engine 1. That is, the integral range appears after the crankangle position "PΘmax" by a predetermined degree, for example, by 10° in crankangle. For ease of understanding, the crankangle position "PΘmax" will be referred to the "maximum pressure crankangle position" in the following description.

That is, the integral range which has been set to contain both the "TDC" crankangle position and the maximum pressure crankangle position "PΘmax" at the higher engine speed side is gradually shifted toward the "ATDC" side (or delayed crankangle position) as the engine rotation speed "Ne" reduces. That is, with decrease in the engine rotation speed "Ne", the integral range comes to a range which does not contain the "TDC" crankangle position, and comes to a range which does not contain both the "TDC" crankangle position and the maximum pressure crankangle position "PΘmax" and finally comes to the range which, as has been described hereinabove in conjunction with the graph of FIG. 3, appears after the maximum pressure crankangle position "PΘmax" by the predetermined degree in crankangle.

Referring back to the flowchart of FIG. 2, at step S2, the existing crankangle position "Θ" is read from the information signal from the crankangle sensor 11. Then, at step S3, a judgment is carried out as to whether or not the crankangle position "Θ" is within the integral range which has been set at step S1. If No, that is, when the judgment is so made that the crankangle position "Θ" is not within the set integral range, the operations flow goes to step S4. At this step, an after-mentioned integral value "IMEP" is reset to 0 (zero) and the operation flow goes to end.

If Yes, at step S3, that is, when the judgment is so made that the crankangle position "Θ" is within the set integral range, the operation flow goes to step S5. At this step, the combustion pressure "P" in a cylinder #1, #2, #3 or #4 is read from an output signal issued from an associated pressure sensor 10a, 10b, 10c or 10d. Of course, the output signal has been subjected to A/D (analog/digital) conversion before being fed to the computer of the control unit 13.

Then, at step S6, the combustion pressure "P" is gradually integrated to renew an integrated value "IMEP" for the combustion pressure. Then, at step S7, a judgment is carried out as to whether or not the integration calculation has come to the terminal end of the set integral range. If No, that is, when the integration calculation is still in the middle of the set integral range, the operation flow goes to end.

While, if Yes at step S7, that is, the judgment is so made that the integration calculation has come to the terminal end and thus a completely integrated value "IMEP" has been provided, the operation flow goes to step S8. At this step, a judgment is carried out as to whether or not the integrated value "IMEP" is equal to or greater than a reference value. It is to be noted that this reference value is a variable value and is set based on the engine load and the engine speed "Ne".

If No at step S8, that is, when the judgment is so made that the integrated value "IMEP" is smaller than the reference value, the operation flow goes to step S9. At this step, it is judged that an abnormal combustion (or misfiring), which would cause a certain drop of the combustion pressure in the integral range, has taken place. Although not shown in the drawings, alarm means is provided which issues an alarm when the number of times of the abnormal combustion judgment exceeds a predetermined number.

If Yes at step S8, that is, when the judgment is so made that the integrated value "IMEP" is equal to or greater than the reference value, the operation flow goes to step 10. At this step, it is judged that a normal combustion, which would allow a satisfied combustion pressure in the integral range, has been kept. The operation flow goes to end.

As is known to those skilled in the art, in a higher engine speed side, a marked difference of combustion pressure is provided between the abnormal and normal combustion conditions particularly in a crankangle range around "TDC" position and/or a range just after "TDC" position.

In view of this phenomenon, in the present invention, the integral range set in the higher engine speed side is large enough for containing the "TDC" crankangle position and the position just after the "TDC" position, as is seen from the graph of step S1 of FIG. 2. Accordingly, the combustion condition can be precisely detected in the higher engine speed side.

While, in a lower engine speed side near the idling speed, the difference of the maximum combustion pressure between the abnormal and normal combustion conditions is very small and the combustion is relatively unstable. Thus, even if the combustion pressure is integrated in a crankangle range which includes the maximum pressure crankangle position, the respective integrated values in the abnormal and normal combustion conditions fail to bring about a marked difference therebetween.

However, in accordance with the present invention, in the lower engine speed side, the integral range is gradually shifted toward the "ATDC" side or the delayed crankangle position as the engine rotation speed reduces. That is, near the idling speed of the engine, the integral range is set to appear after the maximum pressure crankangle position "PΘmax" where the pressure in a cylinder exhibits the maximum under normal combustion operation of the engine. Thus, even in the lower engine speed side, the integrated value "IMEP" can exhibit a marked level difference between the abnormal and normal combustion conditions of the engine.

That is, in a low load condition of the engine, the intermolecular density of fuel is small and thus the combustion time is prolonged. Accordingly, in the crankangle range after the maximum pressure crankangle position "PΘmax", the combustion pressure level is largely varied in accordance with the existing combustion condition. Thus, if, like in the present invention, the integral range is set to match with the prolonged combustion time, the integrated value "IMEP" becomes to exhibit a marked level difference between the abnormal and normal combustion conditions of the engine even in the lower engine speed side. As has been mentioned in the part of step S1, the integral range is set in accordance with the engine rotation speed "Ne".

Accordingly, in the present invention, detection of the abnormal combustion in each cylinder can be precisely carried out throughout substantially whole operation range of the engine, by using the integrated value "IMEP".

In the following, modifications of the present invention will be described.

Although, in the above-mentioned embodiment, the integral range is gradually varied in accordance with the engine rotation speed "Ne", the integral range may have two ranges. That is, in this case, the engine rotation speed "Ne" is grouped into two, that is, a higher speed group and a lower speed group. In the higher speed group, one integral range is set which contains the "TDC" crankangle position and a range just after the "TDC" position, and in the lower speed group, the other integral range is set to appear after the crankangle position where the pressure in a cylinder exhibits the maximum under normal combustion operation of the engine.

Furthermore, if desired, the integral range may be varied in accordance with an engine load as well as the engine rotation speed "Ne". In this case, in the lower engine speed and lower engine load, the integral range is set to appear after the maximum pressure crankangle position.

What is claimed is:

1. A combustion condition detecting system of an internal combustion engine, comprising:

first means for detecting pressure in a cylinder of said engine;

second means for setting an integral range for a crankangle in accordance with a rotation speed of said engine;

third means, coupled to said first means and to said second means, for integrating a detected cylinder pressure within said integral range thereby to derive an integrated value of pressure; and fourth means for judging whether or not an abnormal combustion occurs in the cylinder by comparing said integrated value with a reference value; and wherein said integral range includes first and second integral ranges which are selectively used when the engine operates at higher and lower speed conditions, said first integral range containing a "TDC" (top dead center) crankangle position and a crankangle range just after the "TDC" crankangle position, said second integral range containing a range which appears after a given crankangle position where pressure in the cylinder exhibits a maximum at a normal combustion condition but before the next piston bottom dead center position.

2. A combustion condition detecting system as claimed in claim 1, in which said integral range is gradually shifted toward a "ATDC" (after top dead center) crankangle position side or a delayed crankangle position side as engine rotation speed is reduced.

3. A combustion condition detecting system as claimed in claim 2, in which said second integral range is set to appear after the given crankangle position by 10 degrees of crankangle.

4. A combustion condition detecting system as claimed in claim 1, in which said fourth means judges the occurrence of the abnormal combustion when said integrated value is smaller than said reference value.

5. A combustion condition detecting system as claimed in claim 1, in which said second, third and fourth means are installed in a computer in a software form.

6. A combustion condition detecting system as claimed in claim 1, in which said reference value is determined in accordance with both a load of the engine and a rotation speed of the engine.

7. A combustion condition detecting system as claimed in claim 1, in which said integral range is varied in accordance with an engine load as well as an engine rotation speed.

8. A combustion condition detecting system as claimed in claim 1, further comprising fifth means which issues an alarm when said fourth means judges occurrence of the abnormal combustion.

9. A combustion condition detecting system of an internal combustion engine, comprising:

first means for detecting pressure in a cylinder of said engine;

second means for setting an integral range for a crankangle in accordance with a rotation speed of said engine;

third means, coupled to said first means and to said second means, for integrating a detected cylinder pressure within said integral range thereby to derive an integrated value of pressure; and fourth means for judging whether or not an abnormal combustion occurs in the cylinder by comparing said integrated value with a reference value; and wherein said integral range is set to appear after a given crankangle position where pressure in the cylinder exhibits a maximum at a normal combustion condition, and wherein said integral range includes first and second integral ranges which are selectively used when the engine operates at higher and lower speed conditions, said first integral range containing a "TDC" (top dead center) crankangle position and a crankangle range just after the "TDC" crankangle position, and said second integral range being prevented from containing the "TDC" crankangle position and the crankangle range just after the "TDC" crankangle position.

* * * * *